United States Patent
Tegethoff et al.

(10) Patent No.: US 10,507,786 B2
(45) Date of Patent: Dec. 17, 2019

(54) GAS PRESSURE CONTAINER AND TUBE ELEMENT FOR AN AIRBAG SYSTEM, AND METHOD FOR PRODUCING SAME

(71) Applicant: Benteler Steel/Tube GmbH, Paderborn (DE)

(72) Inventors: Dirk Tegethoff, Salzkotten (DE); Leonhard Rose, Borchen (DE); Darius Wrobel, Paderborn (DE); Jozef Balun, Schlangen (DE)

(73) Assignee: BENTELER STEEL/TUBE GMBH, Paderborn (DE)

( * ) Notice: Subject to any disclaimer, the term of this patent is extended or adjusted under 35 U.S.C. 154(b) by 0 days.

(21) Appl. No.: 15/537,402

(22) PCT Filed: Dec. 18, 2015

(86) PCT No.: PCT/DE2015/100542
§ 371 (c)(1),
(2) Date: Jun. 16, 2017

(87) PCT Pub. No.: WO2016/095909
PCT Pub. Date: Jun. 23, 2016

(65) Prior Publication Data
US 2017/0341619 A1  Nov. 30, 2017

(30) Foreign Application Priority Data

Dec. 19, 2014 (DE) .......................... 10 2014 018 816

(51) Int. Cl.
*B60R 21/26* (2011.01)
*B60R 21/268* (2011.01)
(Continued)

(52) U.S. Cl.
CPC ............ *B60R 21/268* (2013.01); *B60R 21/00* (2013.01); *C21D 6/004* (2013.01); *C21D 6/005* (2013.01);
(Continued)

(58) Field of Classification Search
CPC .................. B60R 21/00; B60R 21/268; B60R 2021/26082; C21D 6/005; C21D 6/004;
(Continued)

(56) References Cited

U.S. PATENT DOCUMENTS

| 4,599,886 A | 7/1986 | Brown |
| 4,802,894 A | 2/1989 | Usami et al. |

(Continued)

FOREIGN PATENT DOCUMENTS

| CN | 101048524 A | 10/2007 |
| CN | 101374966 A | 2/2009 |

(Continued)

OTHER PUBLICATIONS

Office Action for Chinese Application No. 201580068324.1 dated Aug. 1, 2018; 7pp.

(Continued)

*Primary Examiner* — Andrew T Kirsch
*Assistant Examiner* — Elizabeth J Volz
(74) *Attorney, Agent, or Firm* — Hauptman Ham, LLP (57) ABSTRACT

A gas pressure container for an airbag system of a motor vehicle is disclosed having a tube element with a high bursting resistance when internal pressure is being applied. The tube element includes a steel alloy and a first longitudinal portion of the tube element has a tensile strength $Rm_{11}$ higher than (>) 800 MPa, a transition temperature $Tu_{11}$ of at least −40° C., and an outer circumference U1. The tube element also includes at least one second longitudinal portion and/or additional longitudinal portions, which extend (Continued)

axially from the first longitudinal portion. The second longitudinal portion or the additional longitudinal portions and the first longitudinal portion are formed from a seamless or welded single-piece tube made of a uniform material, and more specifically from a hot-rolled or cold-drawn tube.

18 Claims, 9 Drawing Sheets

(51) Int. Cl.
| | |
|---|---|
| *B60R 21/00* | (2006.01) |
| *C21D 6/00* | (2006.01) |
| *C21D 9/08* | (2006.01) |
| *F17C 1/00* | (2006.01) |
| *C22C 38/02* | (2006.01) |
| *C22C 38/04* | (2006.01) |
| *C22C 38/06* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/58* | (2006.01) |

(52) U.S. Cl.
CPC .............. *C21D 6/008* (2013.01); *C21D 9/08* (2013.01); *F17C 1/00* (2013.01); *B60R 2021/26082* (2013.01); *C21D 2221/01* (2013.01); *C22C 38/02* (2013.01); *C22C 38/04* (2013.01); *C22C 38/06* (2013.01); *C22C 38/44* (2013.01); *C22C 38/46* (2013.01); *C22C 38/48* (2013.01); *C22C 38/50* (2013.01); *C22C 38/58* (2013.01); *F17C 2201/0119* (2013.01); *F17C 2203/0639* (2013.01); *F17C 2203/0648* (2013.01); *F17C 2209/2181* (2013.01); *F17C 2209/221* (2013.01); *F17C 2221/031* (2013.01); *F17C 2270/0181* (2013.01)

(58) Field of Classification Search
CPC ...... C21D 6/008; C21D 2221/01; C21D 9/08; C21D 8/10; F17C 1/00; F17C 2201/0119; F17C 2203/0639; F17C 2203/0648; F17C 2209/2181; F17C 2209/221; F17C 2221/031; F17C 2270/0181; C22C 38/02; C22C 38/04; C22C 38/06; C22C 38/44; C22C 38/46; C22C 38/48; C22C 38/50; C22C 38/58; C22C 38/00

USPC .................................................. 220/581–592
See application file for complete search history.

(56) References Cited

U.S. PATENT DOCUMENTS

| 8,196,956 | B1 | 6/2012 | Krupp et al. | |
|---|---|---|---|---|
| 2002/0033591 | A1* | 3/2002 | Erike | C21D 8/10 |
| | | | | 280/743.1 |
| 2002/0040907 | A1* | 4/2002 | Starozhitsky | B60R 21/26 |
| | | | | 220/660 |
| 2003/0183638 | A1* | 10/2003 | Minta | F17C 1/002 |
| | | | | 220/560.13 |
| 2005/0076975 | A1* | 4/2005 | Lopez | C21D 8/10 |
| | | | | 148/593 |
| 2007/0246130 | A1* | 10/2007 | Takano | C22C 38/002 |
| | | | | 148/333 |
| 2015/0053697 | A1* | 2/2015 | Lang | B60R 21/272 |
| | | | | 220/581 |

FOREIGN PATENT DOCUMENTS

| DE | 3437229 | A1 | 4/1985 |
|---|---|---|---|
| DE | 19538386 | A1 | 4/1997 |
| DE | 10143073 | A1 | 5/2002 |
| EP | 0190408 | A1 | 8/1986 |
| EP | 1816227 | A1 | 8/2007 |
| EP | 1983065 | A1 | 10/2008 |

OTHER PUBLICATIONS

International Search Report for PCT/DE2015/100542 dated May 2, 2016, 2 pages.
German Search Report for Application No. 10 2014 018 816.7 dated Nov. 12, 2015, 16 pages.
International Preliminary Report on Patentability, PCT/DE2015/100542, dated Jun. 22, 2017, 12 pages.
Explanation of Relevancy of DIN EN ISO 8495-10-2004 Metallische Werkstoffe-Rohr-Ringaufdornversuch, 8 pages.
Explanation of Relevancy of Krux, Rainer: Herstellung eigenschaftsoptimierter Bauteile mit der Hochdruck-Blechumformung und Analyse der induzierten Eigenspannungen. Aachen: Shaker Verlag, 2004.—ISBN 3-8322-3551-5, 254 pages.

* cited by examiner

GAS PRESSURE CONTAINER AND TUBE ELEMENT FOR AN AIRBAG SYSTEM, AND METHOD FOR PRODUCING SAME

CROSS REFERENCE TO RELATED APPLICATIONS

The present application is a National Phase of International Application Number PCT/DE2015/100542 filed Dec. 18, 2015 and related to and claims priority benefits from German Application Number 10 2014 018 816.7 filed Dec. 19, 2014.

BACKGROUND OF THE INVENTION

1. Field of the Invention

The invention relates to a gas pressure container, and more specifically, to a gas pressure container for an airbag system of a motor vehicle, as well as to a tube element for a gas pressure container and to a method for producing the same.

2. Description of the Related Art

A generic gas pressure container is described in EP 1 983 065 A1. The gas pressure container for an airbag system includes a tube element with a high bursting resistance when internal pressure is applied, wherein the tube element consists of a steel alloy and is to comprise a transition temperature of at least minus (−) 40 degrees Celsius (° C.) in a first longitudinal portion, and the tube element includes a second longitudinal portion and a third longitudinal portion which extend axially from the first longitudinal portion in the direction of two oppositely situated ends of the tube element. The longitudinal portions are realized in one piece and in one material from a seamless or welded, heat-rolled and/or cold-drawn tube, wherein the second longitudinal portion and the third longitudinal portion comprise an outer circumference which is reduced compared to the outer circumference of the first longitudinal portion. In order to ensure the high bursting resistance even in the case of low temperatures, the publication proposes hardening and tempering the finished tube element completely, that is to say after reducing the outer circumference in the second and third longitudinal portions, such that there is a uniform metallic microstructure with predominantly tempered martensite in the entire tube element of the gas pressure container and a tensile strength which is greater than 700 Megapascal (MPa) in the non-reduced central longitudinal portion.

However, it is a disadvantage that the geometrical accuracy and the surface quality are reduced as a result of the tempering of the tube element which tapers at the ends. In addition, as a result of reducing the outer circumference of the second and third longitudinal portions in the cold-drawn state, the cold formability and the bursting resistance are negatively influenced compared to the non-reduced first longitudinal portion.

In addition, US 2002 040 907 A1 describes a gas pressure container with a tube element produced from steel, the tube element being deep-drawn in multiple steps from a metal sheet and, in this case, a last longitudinal portion only being drawn in one step and then one longitudinal portion, in particular a transition region between longitudinal portions which have been drawn at variable frequencies, being subject to heat treatment. A targeted energy intake along with the termination of the start of an axial crack is to be brought about during the test as a result of the heat treatment. The bursting resistance of deep drawn tube elements, however, in spite of multiple heat treatments, are insufficient for present demands which are characterized by requirements for lightweight construction and accompanying thinner wall thicknesses of higher strength steels.

SUMMARY OF THE INVENTION

It is an object of the present invention to provide an improved gas pressure container with a tube element which meets higher demands for bursting resistance and for the bursting process when internal pressure is applied.

It is a further object of the present invention to have a tube element which is improved with regard to ease of machining for use in a gas pressure container.

It is yet another object of the present invention to have a production method by way of which a gas pressure container is able to be created in a particularly economic manner and with the highest quality.

A gas pressure container, in particular for an airbag system of a motor vehicle, including a tube element with high bursting resistance when internal pressure is applied, wherein the tube element consists of a steel alloy and comprises a tensile strength which is greater than 800 Megapascal in a first longitudinal portion, a transition temperature which is at least or rather lower than (minus) −40° C. and an outer circumference, wherein the tube element includes at least one second longitudinal portion as well as, as an option, further longitudinal portions which extend axially from the first longitudinal portion, wherein the second longitudinal portion and, as an option, further longitudinal portions as well as the first longitudinal portion are realized in one piece and in one material from a seamless or welded, in particular hot-rolled or cold-drawn tube, wherein the second longitudinal portion as well as, as an option, further longitudinal portions comprises/comprise an outer circumference which is reduced compared to the outer circumference of the first longitudinal portion. Characteristic in this case is that the tube element in the second longitudinal portion and, as an option, in the further longitudinal portion comprises a transition temperature of lower than (minus) −50° C. which is lower than the transition temperature of the first longitudinal portion.

In this case, the transition temperature is determined by sampling in the respective longitudinal portion as a ring-shaped notch impact test specimen, that is to say as a narrow tube portion with a nominal notch introduced for test purposes. After cooling to the low temperature conditions of the test, an axial impact is effected onto the specimen. At said low temperature, where there is a transition from plastic to brittle breakage behavior, it is referred to as the transition temperature. It is obvious that to determine the same, several specimens have to be tested for the characterization of a longitudinal portion. A transition temperature lower than minus 40° C. signifies within the meaning of the invention a transition temperature in the direction of minus 50° C., minus 60° C., minus 70° C., minus 80° C., minus 90° C. or even lower, as well as arbitrary values between the above-named values.

A plurality of advantages is produced on account of the superior transition temperature of the second and, as an option, further longitudinal portion with a reduced outer circumference. On the one hand, cracks are reliably prevented from occurring in the test or in practical application of the airbag system at points where this would have catastrophic consequences, for example where a connection to further components or attachment parts is provided, such that the forces generated during rupturing could shoot said parts through the interior. On the other hand, the gas pressure container itself or rather detached parts thereof are prevented from being able to fly off as a result of brittle fracture. The otherwise usual stresses which are introduced in the second longitudinal portion and, as an option, in further longitudinal portions, by reducing the circumference are avoided according to the invention.

Within the framework of the invention, the outer circumference is defined either in the case of round tubes for the tube element as an outer diameter, in the case of polygonal tubes, polygonal tapered longitudinal portions or an asymmetric tube cross section, by means of the length of the outer circumference thereof.

In a preferred manner, for the outer circumferences $U_{11}$ of the first longitudinal portion, $U_{12}$ of the second longitudinal portion and $U_{13}$, $U_{16}$ of the further longitudinal portions, the gas pressure container comprises the following correlation:
a. $U_{12}=(0.6-0.9)\times U_{11}$, in particular $U_{12}=(0.7-0.8)\times U_{11}$, and/or
b. $U_{13}=(0.6-0.9)\times U_{11}$, in particular $U_{13}=(0.7-0.8)\times U_{11}$, and/or
c. $U_{16}=(0.65-0.95)\times U_{11}$ in particular $U_{16}=(0.75-0.85)\times U_{11}$.

This means that the transition temperature is realized from less than or rather lower than −50° C. even in the case of the specified reduction in the outer circumferences or rather outer diameters. Generally speaking, it must be assumed that as the reduction in the circumference increases as a result of the relevant longitudinal portion being work hardened, there is also a slight increase in the transition temperature.

In addition, the gas pressure container comprises a wall thickness in the second longitudinal portion and/or in the further longitudinal portions which is greater than the wall thickness in the first longitudinal portion, in particular the wall thickness in the second longitudinal portion is at least 5% greater. The thickening, which is produced, in particular, by simultaneously upsetting and tapering an end of the tube element using a conical outer annular die, produces in absolute terms greater strength and toughness. In addition, the thicker wall has advantages when connecting attachment parts or mounting parts such as, for example, a bursting disk or a closure plate.

However, it is also possible for the wall thickness of the second longitudinal portion and/or of the further longitudinal portion of the gas pressure container to be less than or equal to the wall thickness of the first longitudinal portion. The advantage of this is that when reducing the outer circumference, residual compressive stresses can be introduced into the tube element in a targeted manner in order to counter critical, tangentially acting tensile properties during the burst test or when triggering the airbag system.

Preferably, at least the second longitudinal portion is realized on an end-face end of the tube element. In a particularly preferred manner, a third longitudinal portion is realized on the other end of the tube element and the first longitudinal portion is realized as a center portion between the two ends. The tube element can then be realized in a closed manner at the ends as a result of joining, in particular circumferentially welding, cover plates on the ends.

It is also possible for the second longitudinal portion or a further longitudinal portion with a reduced outer circumference to extend between two first longitudinal portions with a greater circumference of the tube element. It is consequently possible to support or to join mounting parts on the inside wall from the inside of the tube in order, for example, to divide the gas generator into several axial chambers with or rather in one single tube element.

In addition, it can be provided that the gas pressure container comprises, at least in the second longitudinal portion with the reduced outer circumference $U_{12}$ of the tube element, increased plastic deformability in the circumferential direction compared to the first longitudinal portion, wherein the following applies:

$$\text{deformability}_{12} > 1.05 \times \text{deformability}_{11}.$$

The deformability can be characterized, in this case, as ductility or in particular also as elongation at break and can be determined by means of a tube expanding test to DIN EN 8495-2004. The deformability, in this case, is the capacity to change the basic form. This is a relative specification, e.g. U0/U1, U1 being the circumference when a crack appears and U0 the initial circumference, in each case determined in the mandrel expanding test.

Preferably, the gas pressure container in the first longitudinal portion of the tube element comprises a metallic microstructure with a surface portion of at least 70 percent tempered martensite. In particular, the tempered martensite is present predominantly in the elongated needle form.

In addition, it can be provided that the second longitudinal portion of the tube element also comprises a microstructure produced predominantly from tempered martensite with a surface portion of at least 70 percent. In contrast to the first longitudinal portion, however, the tempered martensite is realized without elongating the needles, as a result of which it is easily possible to differentiate between the longitudinal portions even at the stage where the tube elements have not yet been tapered.

It is possible according to the invention for the gas pressure container to comprise a reduced tensile strength $Rm_{12}$ in the second longitudinal portion compared to the tensile strength $Rm_{11}$ of the first longitudinal portion, wherein the following applies:

$$Rm_{12} < 0.9 \times Rm_{11}.$$

The tensile strength has a positive influence on the bursting resistance and is only insignificantly lower in the tapered longitudinal portion than the tensile strength in the first longitudinal portion. It is possible, in particular, for the tensile strength to be reduced as a result of tempering. This brings about a softening of at least 10%, as a result of which, however, low temperature impact resistance is simultaneously increased. This can also apply to the further longitudinal portions, as follows:

$$Rm_{13} < 0.9 \times Rm_{11} \text{ and/or } Rm_{16} < 0.9 \times Rm_{11}.$$

It can additionally be provided that a transition region, in which the tensile strength $Rm_{14}$ continuously increases, is arranged between the second longitudinal portion and the first longitudinal portion of the tube element, wherein the transition region comprises a width which is between 10 and 100 mm, in a preferred manner between 15 and 40 mm.

A transition portion, in which the outer circumference increases continuously in the direction of the first longitudinal portion, can be arranged in a preferred manner on the gas pressure container between the second longitudinal portion and/or between the third longitudinal portion and the first longitudinal portion, wherein the transition portion comprises a width which is greater than the width of the transition region. The metallurgical properties are consequently set in a narrower and in a preferred manner more precise manner than the geometric properties. In particular, geometric notches are avoidable in this way and the width of undefined microstructure states in the transition region which is difficult to interpret are advantageously restricted.

More specifically, the gas pressure container can comprise a mixed ferrite-perlite microstructure with a surface portion of at least 70 percent in the second longitudinal portion and, as an option, in further longitudinal portions of the tube element. Said microstructure then corresponds substantially to the initial microstructure of the material of the steel tube, bainite or martensite also being able to be present, however, as the balance. The deformability of the tube element in said longitudinal portion is clearly improved.

The second longitudinal portion and/or the further longitudinal portion may be realized as a local predetermined breaking point when internal pressure is applied in the gas pressure container and, preferably, the predetermined breaking point is arranged in the center of the gas pressure container, as a result of which a largest possible safety distance is provided from the ends which are welded, in particular, with cover plates. However, it is also possible for the predetermined breaking point to be realized eccentrically in a targeted manner, in particular in the case of a first longitudinal portion with a variable, in particular asymmetrically radial outer circumference or where the progression of the outer circumference is arched in an asymmetrically axial manner.

A tube element with high bursting resistance when internal pressure is applied, in particular for use in a gas pressure container, the tube element is a seamless or welded, in particular hot-rolled and cold-drawn steel tube with a constant outer circumference, wherein the tube element comprises a first longitudinal portion with a tensile strength which is greater than 800 MPa and at least a second portion, and the longitudinal portions are realized in one piece and in one material. The characteristic in this case is that the second and, as an option, further longitudinal portion (indices 12, 13, 16) of the tube element, which is to be processed in particular as a result of cold forming, comprises an increased tube expanding capacity,$_{12,13,16}$ to DIN ISO 8495-2004 compared to the first longitudinal portion (index 11), wherein the following applies:

tube expanding capacity,$_{12}$>1.1* tube expanding capacity,$_{11}$ and/or tube expanding capacity,$_{13}$>1.1* tube expanding capacity,$_{11}$ and/or tube expanding capacity,$_{16}$>1.1* tube expanding capacity,$_{11}$.

The tube expanding capacity is determined, in this case, in the so-called ring expanding test up to breakage to DIN EN ISO 8495:2004. Even if the ring expansion is not identical to the behavior in the case of tube tapering, the result of the test is certainly a valid marker for applying cold forming technology when using tube elements for gas pressure containers.

Preferably, the tube element comprises a hardness $HV_{12}$ in the second longitudinal portion to be processed and/or a hardness $HV_{13}$, $HV_{16}$ in a further longitudinal portion as well as a hardness $HV_{11}$ in the first longitudinal portion. The second and/or further longitudinal portion to be processed has a reduced hardness $HV_{12}$ and/or $HV_{13}$ and/or $HV_{16}$ compared to the first longitudinal portion, wherein the following applies:

$HV_{12}/HV_{11}$=0.4 to 0.99 and/or $HV_{13}/HV_{11}$=0.4 to 0.99 and/or $HV_{16}/HV_{11}$=0.4 to 0.99.

Moreover, the tube element consists of one of the three compositions named below of the following alloy elements in percent by weight along with iron and contaminants necessary to the smelting process:

| C  | between 0.07 and 0.29 | 0.07 to 0.14 | 0.05 to 0.2 |
|----|-----------------------|--------------|-------------|
| Si | 0.1 to 0.55           | 0.1 to 0.55  | ≤0.5        |
| Mn | From 0.2 to 1.6       | From 0.2 to 1.6 | 0.2 to 0.6 |
| P  | <0.025                | <0.025       | <0.020      |
| S  | <0.02                 | <0.02        | <0.005      |
| Cr | <2                    | <1           | 0.6 to 2    |
| Ti | <0.03                 | <0.015       | <0.015      |
| Mo | <0.6                  | <0.4         | <0.4        |
| Ni | <0.6                  | <0.4         | <0.4        |
| Al | 0.001 to 0.05         | 0.001 to 0.05 | 0.001 to 0.05 |
| V  | <0.2                  | <0.1         | —           |
| Nb | <0.05                 | <0.05        | —           |

The important point is that the material comprises good heat treatment characteristics and good hardenability, strength and weldability.

A further aspect of the invention relates to a method for producing a gas pressure container including a tube element with high bursting resistance when internal pressure is applied, which, proceeding from a seamless or welded steel tube, is characterized by the following steps:

Harden and then temper the tube, in a preferred manner prior to cold drawing, cold draw the tube as an option, cut the tube element to length, heat the tube element partially in a second longitudinal portion and/or a further longitudinal portion to heating temperature (Tw), for a maximum of 120s, in a preferred manner a maximum of 30s, wherein a first longitudinal portion is not heated in this case, optional hold at the temperature Tw for a maximum of 120s, in a preferred manner 30s, form the second longitudinal portion and/or the further longitudinal portion by reducing its/their outer circumference $U_{12}$, $U_{13}$, $U_{16}$, in a preferred manner directly after the partial heating or holding process, wherein the tube element comprises a first longitudinal portion with a transition temperature $Tu_{,11}$ and a second longitudinal portion with the transition temperature $Tu_{,12}$ and/or a further longitudinal portion with $Tu_{,13}$, $Tu_{,16}$, wherein the following applies:

Tu,12<Tu,11 and Tu,12<−50° C. and/or

Tu,13<Tu,11 and Tu,13<−50° C. and/or

Tu,16<Tu,11 and Tu,16<−50° C.

cool the second longitudinal portion and/or further longitudinal portion prior to or after the forming process.

In a particularly advantageous manner, the second longitudinal portion or rather further longitudinal portion is heated and warm-formed in one single production step, in a preferred manner a deformation temperature of lower than the recrystallization temperature of the steel alloy Ac3, in particular lower than the Ac1 temperature being set. This leads above all to savings in costs/energy consumption and ensures that the tempered martensitic basic microstructure with a predominantly elongated martensite needle form in the first longitudinal portion is not negatively influenced. The heat exposure can be realized in the process by active cooling of the first longitudinal portion and/or by particularly fast, targeted heat sources for local treatment of the tube.

Not heating the first longitudinal portion in this case in terms of the invention means that it does not experience any significant change in temperature. Slight heating on account of heat conduction inside the tube wall from the heated longitudinal portions to the non-heated longitudinal portions is not deemed to be heating in this case either. In particular, this means that no fundamental change in the metallurgical microstructure and/or the mechanical properties in the first longitudinal portion are brought about.

It can be provided, in addition, that during cooling of the second longitudinal portion from the heating temperature to below 150° C., advantageous tangential internal stresses are set. In this case, it is propitious for the tangential internal stresses, which are brought about by the forming of the second and/or further longitudinal portion, to be countered. This can also be shown by the so-called "ring burster method" according to Dr. Rainer Krux: "Production of property-optimized components in high pressure sheet metal forming and analysis of induced internal stresses", edited in 2004 by "Dortmund forming technology".

BRIEF DESCRIPTION OF THE DRAWINGS

The present invention will now be described, by way of example, with reference to the accompanying drawings, in which:

FIGS. 7a to 7c show a side view and two sectional views of an alternative design variant with a notch; and, FIG. 8 shows a schematic side view of a gas pressure container with closure plates welded on.

In the Figures, the same reference designations are used for identical or similar components, even if a repeated description is omitted for reasons of simplicity.

DETAILED DESCRIPTION OF SOME EMBODIMENTS

Figure 1A:
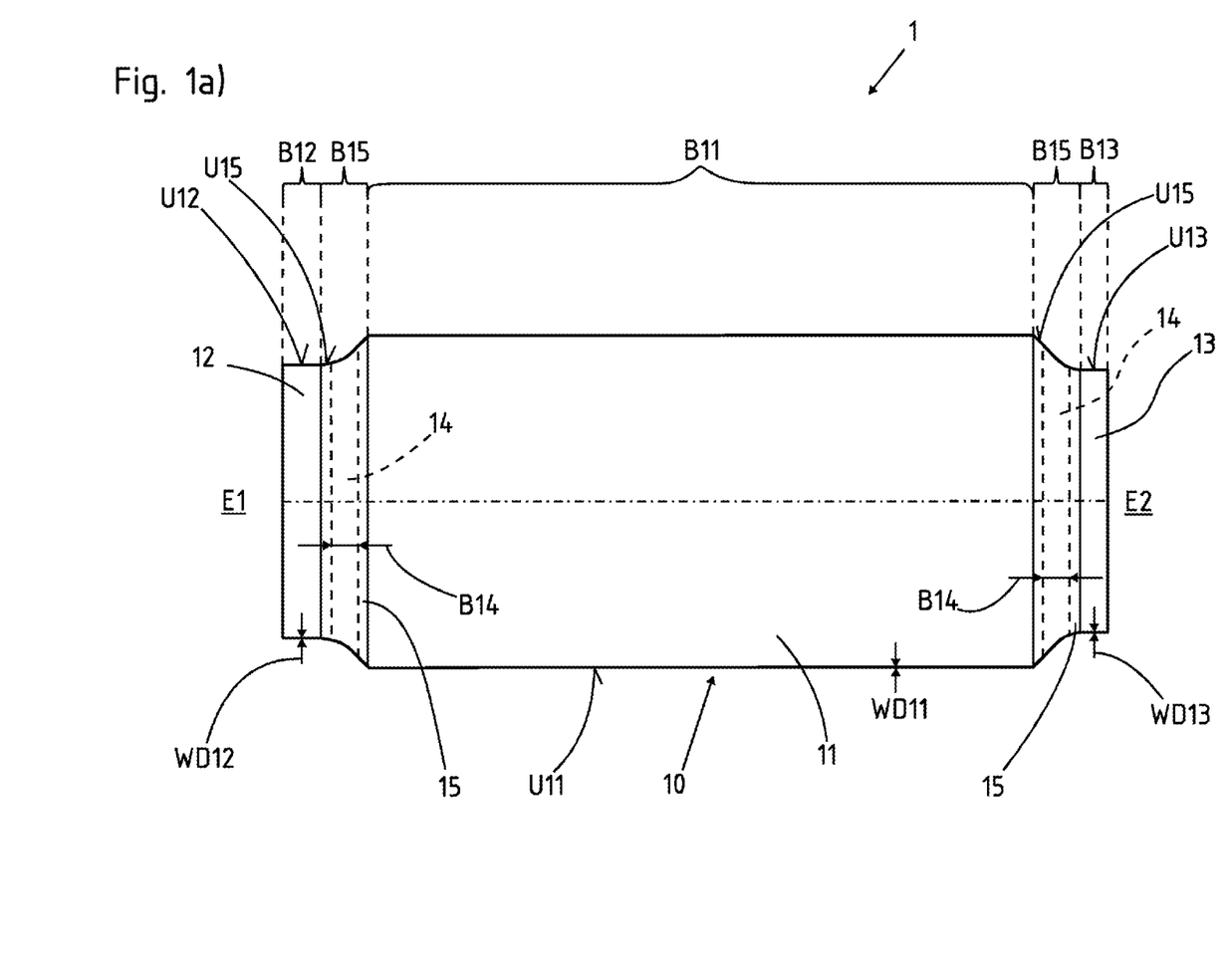
FIGS. 1a to 1c show a first embodiment of the gas pressure container according to the invention.
Figure 1B:
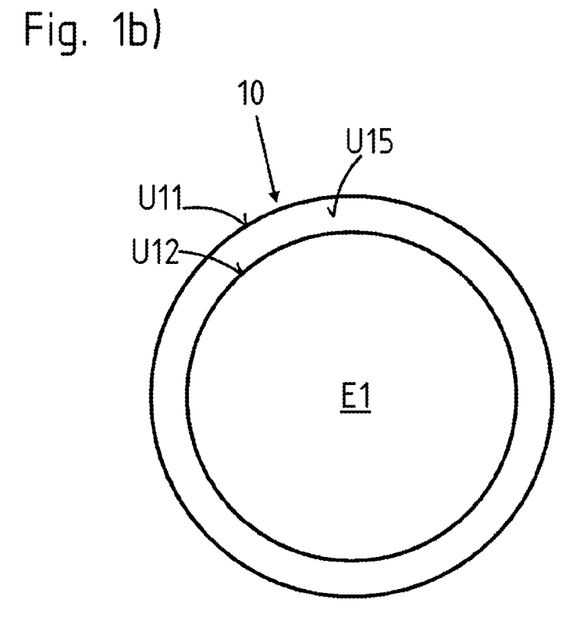
Figure 1C:
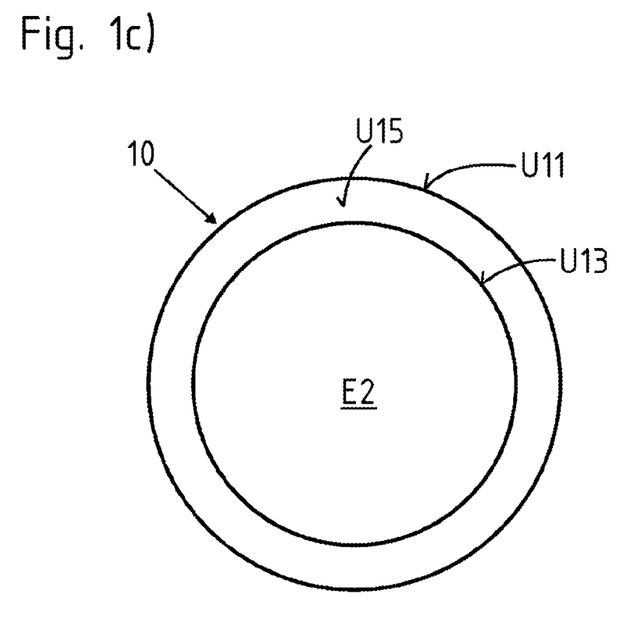

FIG. 1a shows a gas pressure container 1 which includes a tube element 10 having a second longitudinal portion 12 with a wall thickness $WD_{12}$ and a third longitudinal portion 13 and a wall thickness $WD_{13}$ at the corresponding ends $E_1$, $E_2$ of the tube element 10 and includes a first longitudinal portion 11 which is arranged between the second longitudinal portion 12 and third longitudinal portion 13. The second and third longitudinal portions 12, 13 comprise a smaller outer circumference $U_{12}$, $U_{13}$ compared to the outer circumference $U_{11}$ of the first longitudinal portion 11, as can be seen in FIGS. 1b and 1c, the outer circumference $U_{15}$ merging continuously in each case in a transition portion 15 from the first longitudinal portion 11 into the second or rather into the third longitudinal portion 12, 13. The first longitudinal portion 11 comprises a constant outer circumference $U_{11}$. The second and third longitudinal portions 12, 13 comprise a transition temperature $Tu_{12}$, $Tu_{13}$ of lower than −50° C. which is also lower than the transition temperature $Tu_{11}$ of the first longitudinal portion 11. The first longitudinal portion 11 comprises a tensile strength of at least 800 MPa and a metallurgical microstructure with a surface portion of at least 70% tempered martensite. In the transition region 14 (shown by the broken line) between first longitudinal portion 11 and second longitudinal portion 12 or rather first longitudinal portion 11 and third longitudinal portion 13, a rather undefined mixed microstructure and/or undefined mechanical characteristic values is/are present, which is why the width $B_{14}$ of the transition portion 14 is smaller than the width $B_{12}$ of the second longitudinal portion 12 and $B_{13}$ of the third longitudinal portion 13. In a preferred manner, the width $B_{14}$ is also smaller than the width $B_{15}$ of the transition region 15. FIGS. 1b and 1c show in each case a frontal view of the tube element 10. The respective outer circumferences $U_{11}$, $U_{12}$ and $U_{11}$, $U_{13}$ as well as the circumference $U_{15}$ of the transition portion 15 which extends in between in each case can easily be seen. The transition temperatures $T_{u,10}$, $T_{u,11}$, $T_{u,11'}$, $T_{u,12}$, $T_{u,13}$, $T_{u,15}$, $T_{u,16}$, are named in the description, but are not shown in the figures.

Figure 2:
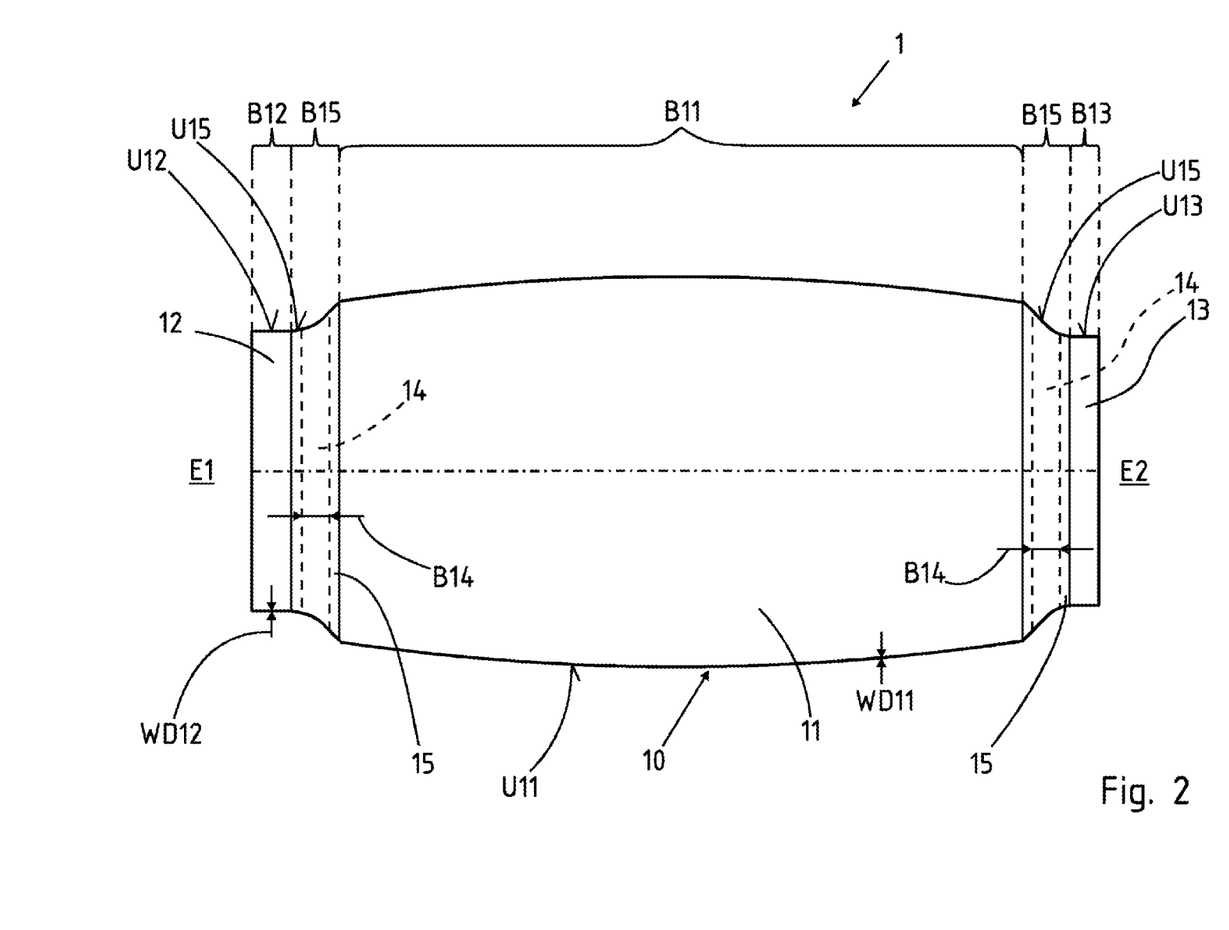
FIG. 2 shows a second embodiment of the gas pressure container according to the invention.

FIG. 2 shows a second embodiment of the gas pressure container 1 according to the invention, which includes a tube element 10 having a second longitudinal portion 12 and a third longitudinal portion 13 and a first longitudinal portion 11 which is arranged between the second longitudinal portion 12 and the third longitudinal portion 13. The second and third longitudinal portions 12,13 comprise a smaller outer circumference $U_{12}$, $U_{13}$ compared to the outer circumference $U_{11}$ of the first longitudinal portion 11, the outer circumference $U_{15}$ merging continuously in each case in a transition portion 15 from the first longitudinal portion 11 into the second and third longitudinal portions 12, 13. In longitudinal extension, the first longitudinal portion 11 comprises an outer circumference $U_{11}$ which is arched slightly radially outward, the outer circumference as the outer diameter being consequently shown to be circular in this embodiment too. The second and third longitudinal portions 12,13 comprise a transition temperature $Tu_{12}$, $Tu_{13}$ of lower than −50° C. which is also lower than the transition temperature $Tu_{11}$ of the first longitudinal portion 11. The first longitudinal portion 11 comprises a tensile strength of at least 800 MPa and a metallurgical microstructure with a surface portion of at least 70% tempered martensite. In the transition region 14 (shown by the broken line) between first longitudinal portion 11 and second longitudinal portion 12 or rather first longitudinal portion 11 and third longitudinal portion 13, a rather undefined mixed microstructure and/or undefined mechanical characteristic values is/are present, which is why the width $B_{14}$ of the transition portion 14 is smaller than the width $B_{12}$ of the second and $B_{13}$ of the third longitudinal portions 12, 13. In a preferred manner, the width $B_{14}$ is also smaller than the width $B_{15}$ of the transition region 15. The transition region 14 is consequently located in the transition region 15.

Figure 3:
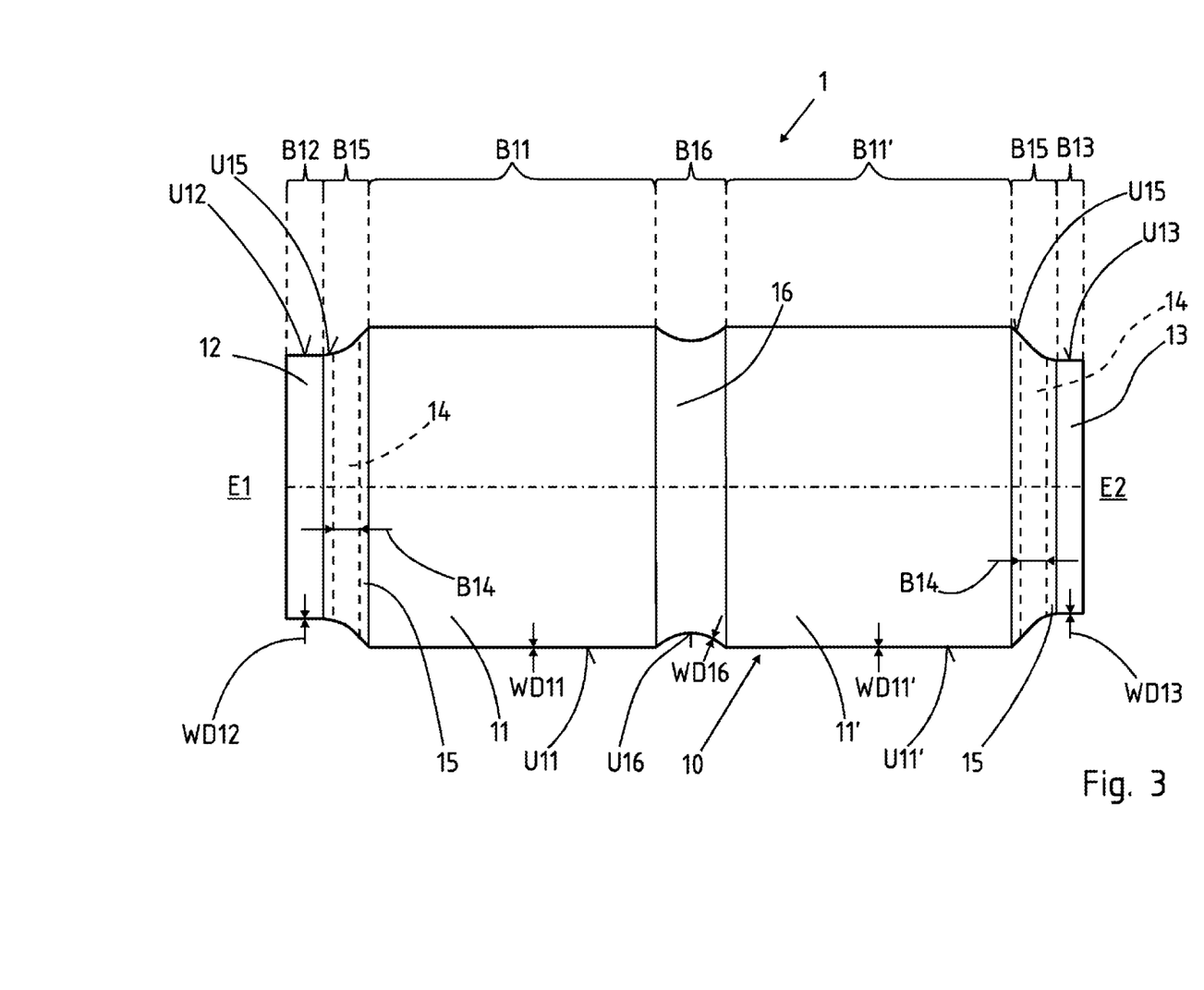
FIG. 3 shows a third embodiment of the gas pressure container according to the invention.

FIG. 3 shows a third embodiment of the gas pressure container 1 according to the invention which includes a tube element 10 having a second longitudinal portion 12 at a first end $E_1$ of the tube element 10 and a third longitudinal portion 13 at the second end $E_2$ of the tube element 10 as well as two first longitudinal portions 11, 11' which are arranged in the region between the ends $E_1$, $E_2$. The second and third longitudinal portions 12,13 comprise a smaller outer circumference $U_{12}$, $U_{13}$ compared to the first longitudinal portions 11, 11', the outer circumference $U_{15}$ merging continuously in each case in a transition portion 15 from the first longitudinal portions 11, 11' into the second or rather third longitudinal portions 12, 13. In addition, the two first longitudinal portions 11, 11' enclose a further longitudinal portion 16 which is realized in a reduced manner in the outer circumference $U_{16}$ compared to the first longitudinal portions 11, 11'. The outer circumferences $U_{16}$, $U_{12}$ and $U_{13}$ can be different to one another, the dimension of the further longitudinal portion 16 being adaptable in particular to mounting parts, such as a bursting disk (not shown), which are to be joined thereto or are supported thereon inside the tube element. In contrast, the dimension of the second and third longitudinal portions 12,13 are measured such that closure plates, as shown in FIG. 7, or the like are attachable, in particular are weldable to the ends $E_1$, $E_2$ of the tube element 10. The second and third longitudinal portions 12,13 comprise a transition temperature Tu,12, Tu, 13 of lower than −50° C. which is also lower than the transition temperature Tu, 11, Tu, $_{11'}$ of the first longitudinal portions 11, 11'. The first longitudinal portions 11, 11' comprise a tensile strength of at least 800 MPa and a metallurgical microstructure with a surface portion of at least 70% tempered martensite. In the transition regions 14 between first longitudinal portion 11 and second longitudinal portion 12 or rather first longitudinal portions 11, 11' and third longitudinal portion 13 as well as first longitudinal portions 11, 11' and further longitudinal portion 16, a rather undefined mixed microstructure and/or undefined mechanical characteristic values is/are present, which is why the width $B_{14}$ of the transition portions 14 (shown by the broken line) is smaller than the width $B_{12}$ of the second and $B_{13}$ of the third longitudinal portions 12, 13. In a preferred manner, the width $B_{14}$ is also smaller than the width B is of the transition portions 15. In addition, there is a wall thickness $WD_{16}$ in the further longitudinal portion 16. The wall thickness $WD_{16}$ can be greater or smaller than the wall thickness $WD_{11}$, $WD_{11'}$.

Figure 4:
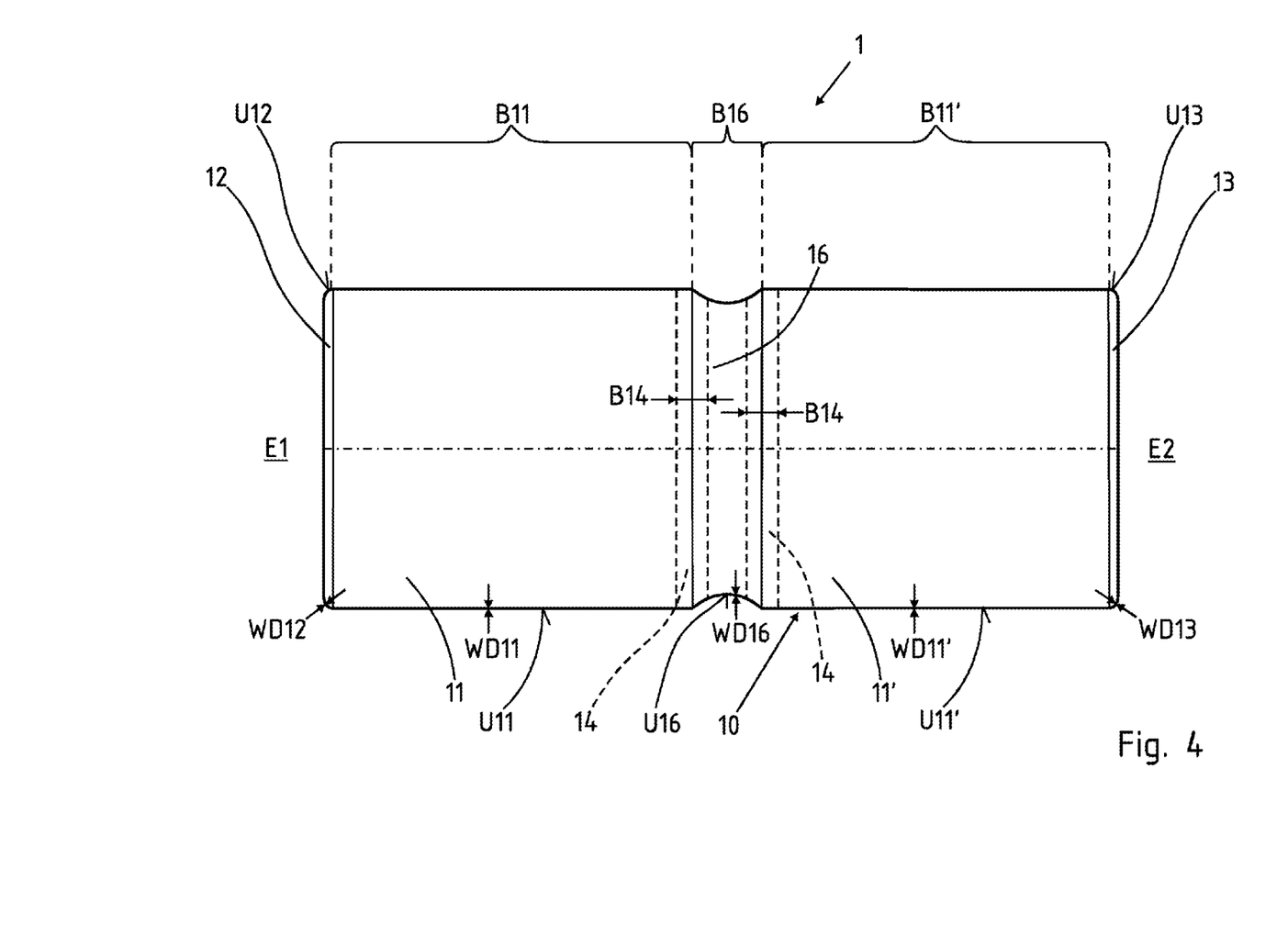
FIG. 4 shows a fourth embodiment of the gas pressure container according to the invention.

FIG. 4 shows a fourth embodiment of the gas pressure container 1 according to the invention which includes a tube element 10 having a further longitudinal portion 16 with a smaller outer circumference $U_{16}$ compared to the two first longitudinal portions 11, 11', which extend axially therefrom to the ends $E_1$, $E_2$ of the tube element 10 and have an outer circumference $U_{11}$, $U_{11'}$.

Figure 5:
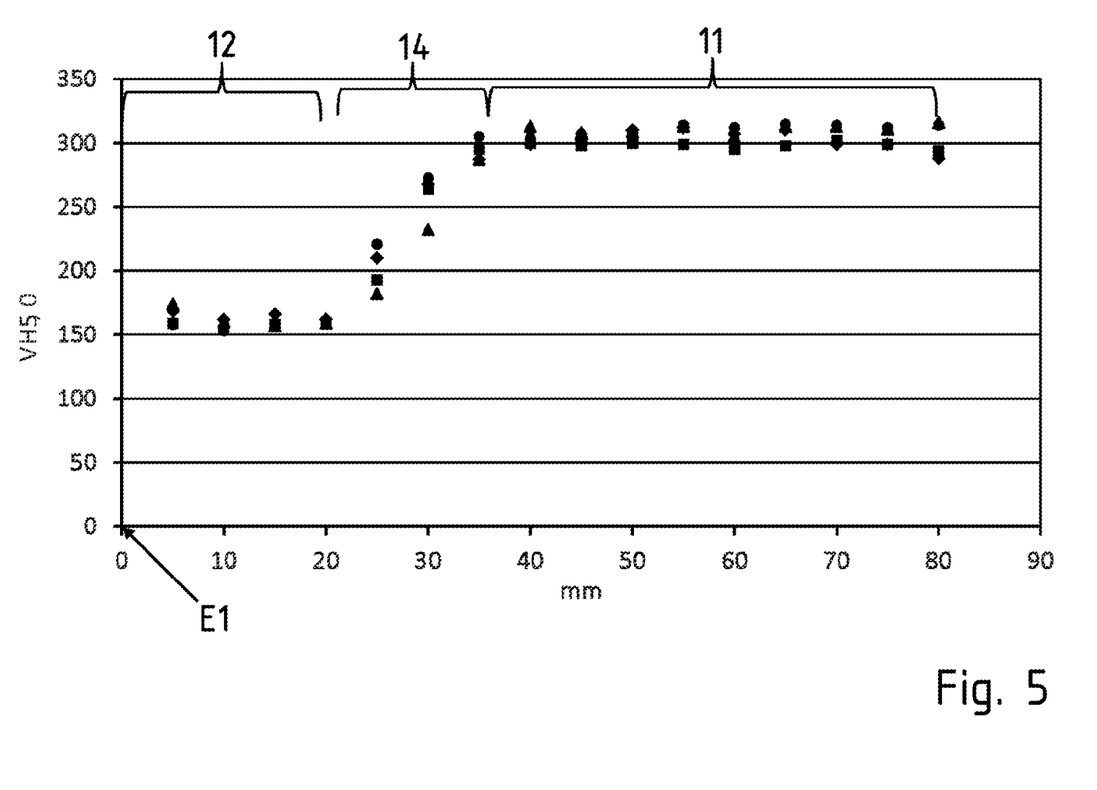
FIG. 5 shows hardness progression on the tube element prior to reduction of the outer circumference in the second longitudinal portion.

The outer circumference $U_{16}$ is adapted in particular to mounting parts, such as a bursting ring, which are to be joined thereto inside the tube element or are supported thereon. At the ends $E_1$ and $E_2$ of the tube element 10 are a second and a third longitudinal portion 12, 13 which, with reference to the longitudinal direction, are very short and which have the outer circumferences $U_{12}$, $U_{13}$ which are smaller than the non-reduced outer circumference of the first longitudinal portions $U_{11}$, $U_{11'}$ but greater than the reduced outer circumference $U_{16}$ of the further longitudinal portion 16 in a central longitudinal portion. The second and third longitudinal portions 12,13 comprise a transition temperature Tu,12, Tu,13 of lower than −50° C. which is also lower than the transition temperature Tu,11 of the first longitudinal portion 11, 11 '. The first longitudinal portion 11, 11 ' comprises a tensile strength of at least 800 MPa and a metallurgical microstructure with a surface portion of at least 70% tempered martensite. In the transition region 14 between first and further longitudinal portions 11, 11', 16, a rather undefined mixed microstructure and/or undefined mechanical characteristic values is/are present. FIG. 5 shows the hardness progression on a tube element 10 according to the invention prior to reduction of the outer circumference, proceeding from the first end E1 in the axial direction via a second longitudinal portion 12 to the first longitudinal portion 11. It is possible to see the lower hardness and consequently tensile strength in the second longitudinal portion and a transition region 14 with increasing hardness values up to a maximum which then remain constant in the first longitudinal portion 11.

Figure 6A:
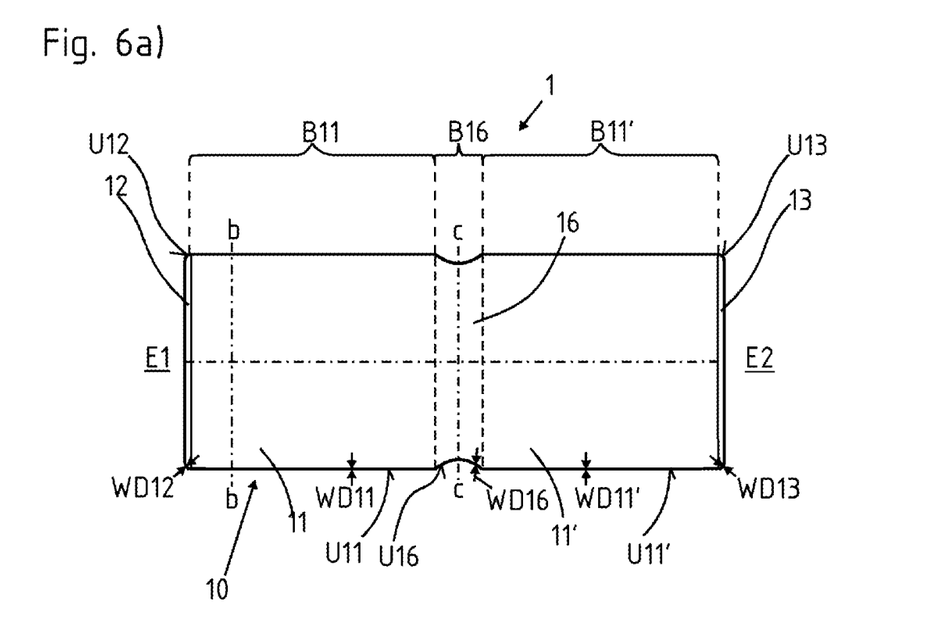
FIGS. 6a to 6c show a side view and two sectional views of the embodiment according to FIG. 4.
Figure 6B:
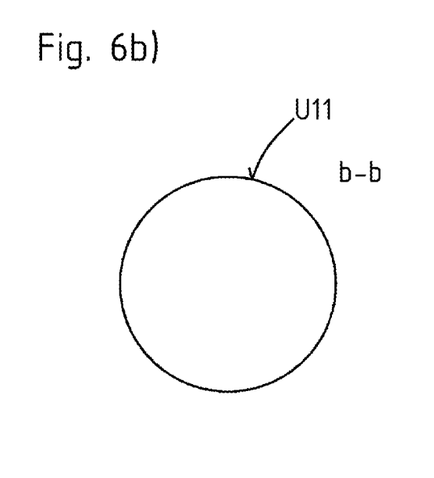
Figure 6C:
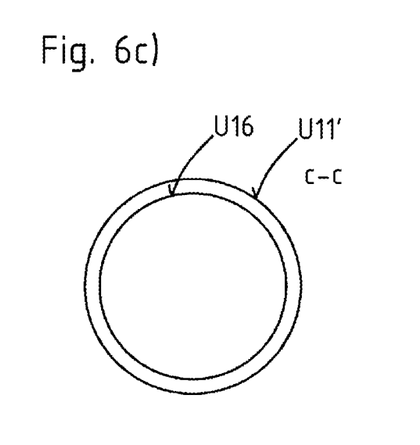

FIGS. 6a to 6c once again show a design variant according to FIG. 4. FIG. 6b shows a cutting line b-b from FIG. 6a. The constant circular outer circumference $U_{11}$ of the first longitudinal portion 11 can be seen. FIG. 6c shows a cutting line c-c from FIG. 6a through the further longitudinal portion 16. It can be seen that this too comprises a circular outer circumference $U_{16}$ which is, however, smaller than the outer circumference $U_{11'}$ of the first longitudinal portion 11' which is located behind it in the viewing direction according to FIG. 6c.

Figure 7A:
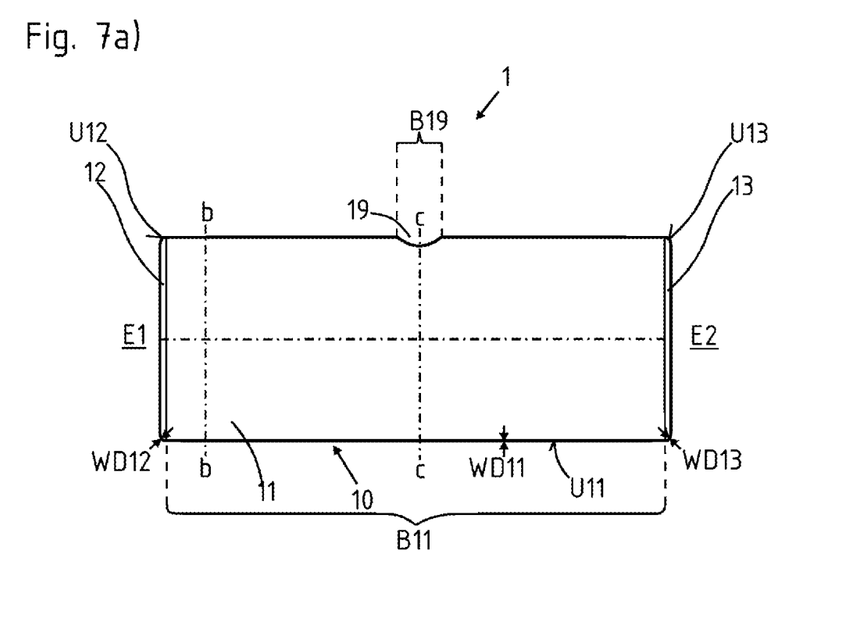
Figure 7B:
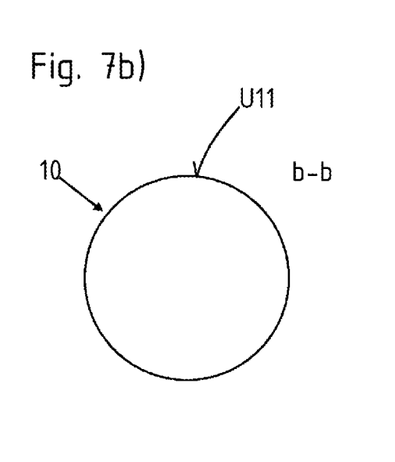
Figure 7C:
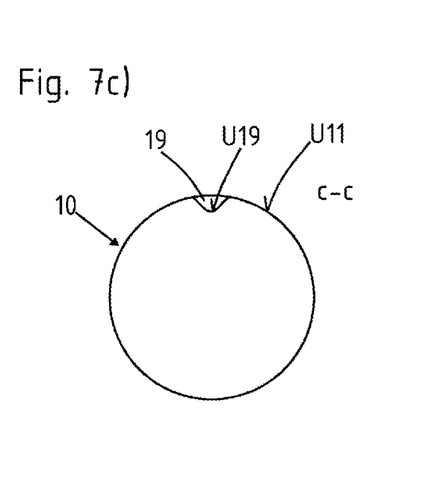

FIGS. 7a to 7c show an alternative design variant to this. According to FIG. 7b, which shows a sectional representation b-b from FIG. 7a, a constant outer circumference $U_{11}$ of the first longitudinal portion 11 is shown once again. In a central region with reference to the longitudinal direction, this latter comprises a notch 19 or rather cavity. The outer circumference $U_{19}$ produced by the notch 19 is enlarged compared to the outer circumference $U_{11}$ which is located behind it in the viewing direction according to FIG. 7c. The notch 19 can be introduced into the lateral surface of the tube element 10 in any arbitrary geometric form. In particular, the further longitudinal portion produced with the notch 19 can be applied to any arbitrary exemplary embodiment in said publication.

Figure 8:
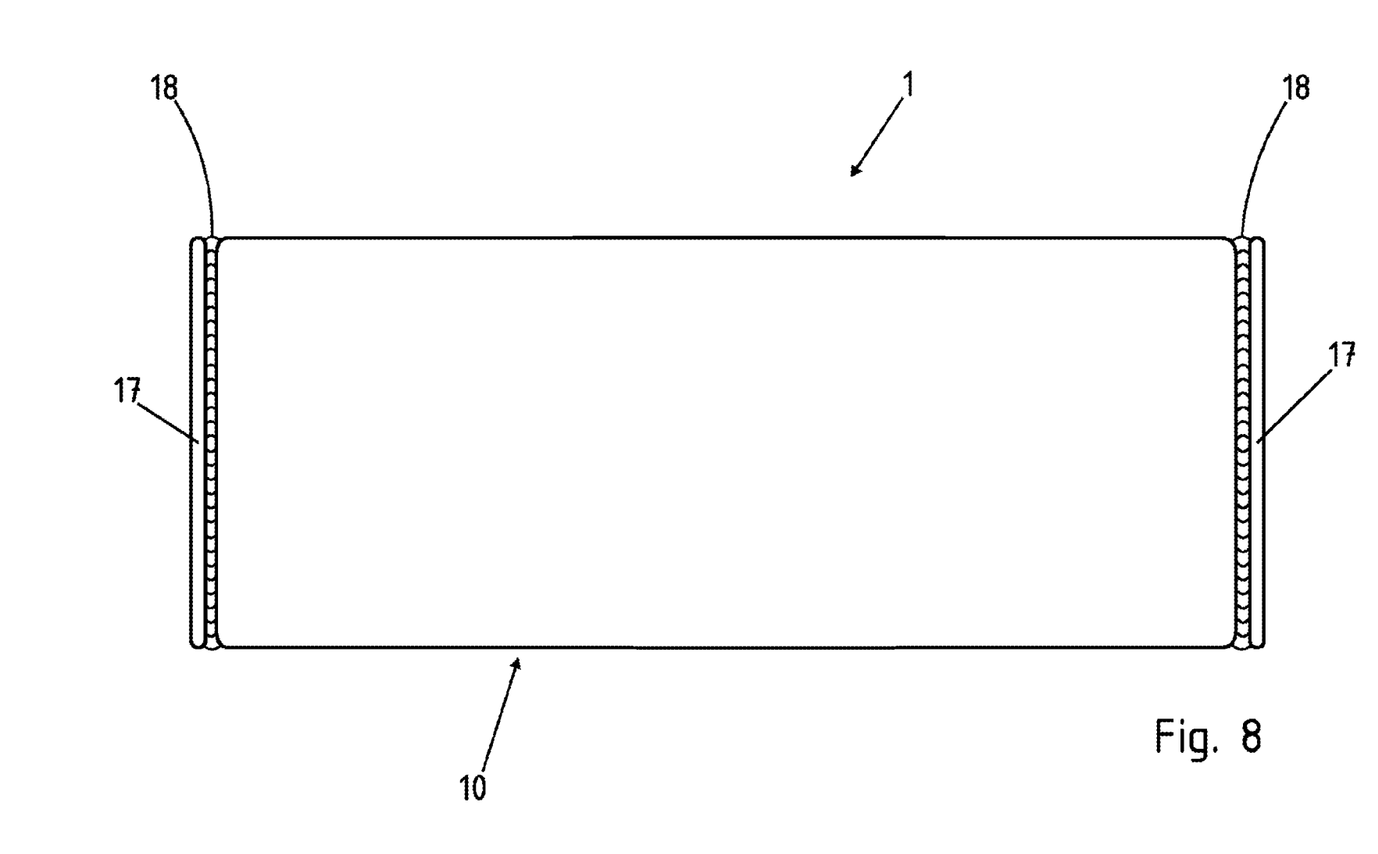

FIG. 8 shows a schematic view of the tube element 10 with closure plates 17. The closure plates 17 are seal welded to the tube element by way of a circumferential weld seam 18. The closure plates can be welded to the ends E1 and E2 on all previously described exemplary embodiments.

The foregoing description of some embodiments of the invention has been presented for purposes of illustration and description. It is not intended to be exhaustive or to limit the invention to the precise form disclosed, and modifications and variations are possible in light of the above teachings or may be acquired from practice of the invention. The specifically described embodiments explain the principles and practical applications to enable one ordinarily skilled in the art to utilize various embodiments and with various modifications as are suited to the particular use contemplated. It is intended that the scope of the invention be defined by the claims appended hereto, and their equivalents. Further, it should be understood that various changes, substitutions and alterations can be made hereto without departing from the spirit and scope of the invention as described by the appended claims.

The invention claimed is:

1. A gas pressure container for an airbag system of a motor vehicle, the gas pressure container comprising:
   a tube element with high bursting resistance when internal pressure is applied,
   wherein the tube element is of a steel alloy,
   wherein the tube element includes at least one first longitudinal portion which comprises
   a tensile strength which is greater than 800 MPa,
   a transition temperature of lower than −40° C., and
   an outer circumference,
   wherein the tube element further includes a second longitudinal portion which extends axially from the first longitudinal portion,
   wherein the second longitudinal portion and the first longitudinal portion form a monolithic seamless or welded tube,
   wherein the second longitudinal portion comprises an outer circumference which is reduced compared to the outer circumference of the first longitudinal portion, wherein the second longitudinal portion comprises a transition temperature lower than −50° C. and lower than the transition temperature of the first longitudinal portion, and wherein the second longitudinal portion is on an end of the tube element.

2. The gas pressure container as claimed in claim 1,
wherein the tube element further includes at least one third longitudinal portion which extends axially from the first longitudinal portion, wherein the third longitudinal portion and the first longitudinal portion form a monolithic seamless or welded tube, and wherein the third longitudinal portion comprises
an outer circumference which is reduced compared to the outer circumference of the first longitudinal portion, and
a transition temperature lower than −50° C. and lower than the transition temperature of the first longitudinal portion.

3. The gas pressure container as claimed in claim 2,
wherein the tube element includes two third longitudinal portions, and
wherein the following correlation applies:

$$U_{12}=(0.6–0.9) \times U_{11}, \text{ and/or}$$

$$U_{13}=(0.6–0.9) \times U_{11}, \text{ and/or}$$

$$U_{16}=(0.65–0.95) \times U_{11},$$

where
$U_{11}$ is the outer circumference of the first longitudinal portion,
$U_{12}$ is the outer circumference of the second longitudinal portion,
$U_{13}$ is the outer circumference of one of the third longitudinal portions, and
$U_{16}$ is the outer circumference of another of the third longitudinal portions.

4. The gas pressure container as claimed in claim 2,
wherein a wall thickness of the first longitudinal portion is less than a wall thickness of the second longitudinal portion and/or a wall thickness of the third-longitudinal portion.

5. The gas pressure container as claimed in claim 4,
wherein the wall thickness of the second longitudinal portion and/or the wall thickness of the third longitudinal portion is at least 5% greater than the wall thickness in the first longitudinal portion.

6. The gas pressure container as claimed in claim 2,
wherein a wall thickness of the first longitudinal portion is greater than or equal to a wall thickness of the second longitudinal portion and/or a wall thickness of the third longitudinal portion.

7. The gas pressure container as claimed in claim 2,
wherein the tube element further includes a transition portion having an outer circumference that increases continuously in the direction of the first longitudinal portion, and
wherein the transition portion is arranged between the second longitudinal portion and the first longitudinal portion and/or between the third longitudinal portion and the first longitudinal portion.

8. The gas pressure container as claimed in claim 7,
wherein a transition region is located in the transition portion, and wherein the transition portion comprises a width which is greater than a width of the transition region.

9. The gas pressure container as claimed in claim 2,
wherein the third longitudinal portion is a local predetermined breaking point arranged in a center of the gas pressure container when internal pressure is applied in the gas pressure container.

10. The gas pressure container as claimed in claim 1,
wherein the end of the tube element with the second longitudinal portion is a first end of the tube element,
wherein the tube element further includes a third longitudinal portion on a second end of the tube element, and
wherein the first longitudinal portion is a center portion between the second and third longitudinal portions.

11. The gas pressure container as claimed in claim 1,
wherein the tube element includes two first longitudinal portions between which the second longitudinal portion and/or a third longitudinal portion of the tube element extends, the third longitudinal portion having a reduced outer circumference compared to the outer circumference of the two first longitudinal portions.

12. The gas pressure container as claimed in claim 1,
wherein the following applies:

$$\text{deformability}_{,12} > 1.05 \times \text{deformability}_{,11},$$

where
deformability$_{,11}$ is a plastic deformability of the first longitudinal portion in a circumferential direction of the tube element, and
deformability$_{,12}$ is a plastic deformability of the second longitudinal portion in the circumferential direction.

13. The gas pressure container as claimed in claim 1,
wherein the first longitudinal portion and/or the second longitudinal portion comprises/comprise a metallic microstructure with a surface portion of at least 70 percent tempered martensite.

14. The gas pressure container as claimed in claim 1,
wherein the following applies:

$$Rm_{,12} < 0.9 \times Rm_{,11},$$

where
$Rm_{,11}$ is the tensile strength of the first longitudinal portion, and
$Rm_{,12}$ is a tensile strength of the second longitudinal portion.

15. The gas pressure container as claimed in claim 1,
wherein the tube element further includes a transition region having a tensile strength that continuously increases,
wherein the transition region is arranged between the second longitudinal portion and the first longitudinal portion, and
wherein the transition region comprises a width which is between 10 and 100 mm.

16. The gas pressure container as claimed in claim 1,
wherein the second longitudinal portion of the tube element comprises a mixed ferrite-perlite microstructure with a surface portion of at least 70 percent.

17. The gas pressure container as claimed in claim 1,
wherein the tube element includes a further longitudinal portion which comprises
a notch in a lateral surface of the tube element, and
an outer circumference with the notch being enlarged compared to the outer circumference of the first longitudinal portion.

18. The gas pressure container as claimed in claim 1,
wherein the tube element further includes a transition region having a tensile strength that continuously increases,
wherein the transition region is arranged between the second longitudinal portion and the first longitudinal portion, and
wherein the transition region comprises a width which is between 15 and 40 mm.

* * * * *